United States Patent
Gödecke (10) Patent No.: US 6,702,702 B2
(45) Date of Patent: Mar. 9, 2004

(54) AUTOMATIC GEARBOX HAVING A CONTROL DEVICE FOR SELECTING A GEARBOX DRIVING POSITION

(75) Inventor: Tobias Gödecke, Kernen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/897,010

(22) Filed: Jul. 2, 2001

(65) Prior Publication Data

US 2002/0022543 A1 Feb. 21, 2002

(30) Foreign Application Priority Data

Jul. 5, 2000 (DE) ............................. 100 32 680

(51) Int. Cl.⁷ ............................................. F16H 61/12
(52) U.S. Cl. ..................... 475/132; 477/131; 477/906; 192/87.18
(58) Field of Search ................. 477/125, 127, 477/130, 131, 906; 74/335; 475/132; 192/87.18

(56) References Cited

U.S. PATENT DOCUMENTS

| | | | |
|---|---|---|---|
| 5,409,434 A | | 4/1995 | Furukawa et al. |
| 5,437,204 A | * | 8/1995 | Person ........................ 475/133 |
| 5,445,043 A | * | 8/1995 | Eaton et al. ................... 74/335 |
| 5,762,580 A | * | 6/1998 | Walega et al. ............... 477/130 |
| 5,797,294 A | * | 8/1998 | Bohner et al. ................. 74/335 |
| 6,010,427 A | * | 1/2000 | Hagimoto et al. ........... 477/125 |
| 6,055,879 A | * | 5/2000 | Abe et al. ...................... 74/335 |
| 6,077,182 A | * | 6/2000 | Long et al. .................. 475/128 |
| 6,263,751 B1 | * | 7/2001 | Arimoto .................... 192/87.18 |

\* cited by examiner

*Primary Examiner*—Ankur Parekh
(74) *Attorney, Agent, or Firm*—Kenyon & Kenyon (57) ABSTRACT

An automatic gearbox includes a control device for selecting a gearbox driving position, which device includes at least one spool valve via which at least one pressure connection may be connected to at least one consumer, and having at least one shift valve via which at least one pressure connection from at least one pressure supply of the control device may be shifted to the spool valve in order to actuate the spool valve. The control device includes a retaining device via which, if the shift valve should fail, the spool valve may be fixed in at least one control position and the selected gearbox driving position may be retained.

8 Claims, 8 Drawing Sheets

AUTOMATIC GEARBOX HAVING A CONTROL DEVICE FOR SELECTING A GEARBOX DRIVING POSITION

FIELD OF THE INVENTION

The present invention relates to an automatic gearbox having a control device for selecting a gearbox driving position.

BACKGROUND INFORMATION

In the case of automatic gearboxes for motor vehicles, it is conventional to transmit a motor vehicle driver's requirement for a gearbox driving position, specifically with regard to a forward driving position V, a reverse driving position R, a neutral position N and a parking position P, to the automatic gearbox from a selector lever mechanically via a linkage. The linkage can be used to actuate a hydraulic spool valve via which consumers, in particular brakes and clutches for the individual gearbox driving positions, can be connected to pressure connections.

U.S. Pat. No. 5,409,434 describes a generic automatic gearbox of a control device for selecting a gearbox driving position. The control device has three hydraulic spool valves which can be actuated via electrically actuatable shift valves, as a result of which what is referred to as "shift-by-wire" gear-changing can be implemented. A selector lever can be replaced by electric switches, and a linkage by signal lines, enabling construction space, in particular, to be reduced and tolerances to be avoided.

It is an object of the present invention to provide an automatic gearbox having a control device for selecting a gearbox driving position and providing improved driving safety.

SUMMARY

The present invention provides an automatic gearbox having a control device for selecting a gearbox driving position, which device includes at least one spool valve via which at least one pressure connection may be connected to at least one consumer, and having at least one shift valve via which at least one pressure connection from at least one pressure supply of the control device may be shifted to the spool valve in order to actuate the spool valve.

The control device may include a retaining device via which, if the shift valve should fail, the spool valve may be fixed in at least one control position and the selected gearbox driving position may be retained. If the control valve should fail, in the selected gearbox driving position, a motor vehicle may at least be moved from a hazardous location and the driving safety may be increased.

The retaining device may be implemented by various arrangements and may be implemented, for example, mechanically, electromechanically and/or electromagnetically. Additionally, the retaining device may be implemented hydraulically, enabling construction space, installation outlay and costs to reduced. This may be achieved in a particularly simple and cost-effective manner in terms of construction by a changeover valve, in particular a ball changeover valve, which, when the shift valve is activated, enables a pressure connection between the pressure supply of the control device and a pressure chamber on the spool valve, and, when the shift valve is subsequently deactivated, changes over and prevents a return flow from the pressure chamber.

A further example embodiment of the present invention provides an automatic gearbox having a control device for selecting a gearbox driving position, which device includes at least one first spool valve for a first gearbox driving position, for example for forward travel, and at least one second spool valve for a second gearbox driving position, for example for reverse travel, via which spool valves at least one pressure connection may be connected to at least one consumer, and having at least one shift valve for the first gearbox driving position and a shift valve for the second gearbox driving position, via which shift valves at least one pressure connection from at least one pressure supply of the control device may be shifted to the respective spool valve in order to actuate the spool valve.

The pressure connection, which may be shifted via the first shift valve, for the first gearbox driving position is conducted via the second spool valve and, when the second gearbox driving position is selected, the pressure connection for the first gearbox driving position is interrupted by the second spool valve. It may reliably be avoided that when the second gearbox driving position is selected a malfunction is simultaneously able to actuate the first spool valve and connect consumers, in particular brakes and clutches for the first gearbox driving position, to pressure connections via the first spool valve. The pressure connection, which may be shifted via the second shift valve, for the second gearbox driving position may be conducted via the first spool valve and, when the first gearbox driving position is selected, may be interrupted by the first spool valve. It may reliably be avoided that, when the first gearbox driving position is selected, a malfunction is able to simultaneously actuate the second spool valve and connect consumers, in particular brakes and clutches for the second gearbox driving position, to pressure connections via the second spool valve.

If the control device has a retaining device via which, if the shift valve should fail, the spool valve may be fixed in at least one control position and the selected gearbox driving position be retained, resetting of the spool valve and of the selected gearbox driving position may be achieved by an additional shift valve. However, the control device may include, in addition to the two spool valves for the two first gearbox driving positions, in particular for the forward driving position and the reverse driving position, at least one third spool valve for a third gearbox driving position, in particular the neutral position, which third spool valve may be actuated by simultaneous activation of the first and second shift valves and, as a result, a pressure connection may be produced for resetting the first and/or second spool valve. An additional shift valve for resetting the first and second gearbox driving positions and construction space and costs associated therewith may be reduced. A spool valve is less expensive than a shift valve and may be integrated in a hydraulic plate in a space-saving manner.

In a further example embodiment of the present invention, the shift valves are pulse-controlled, as a result of which energy usage may be reduced and wear may be reduced.

In order to actuate a parking brake, a relatively large force is required in comparison to an actuating force of the three spool valves ("forward", "reverse", "neutral"). If the pressure supply of the control device is designed exclusively for selecting at least one forward driving position, at least one reverse driving position and/or a neutral position, this may be implemented at a low pressure level.

The parking brake may be actuated mechanically, electrically and/or electromagnetically. A separate spool valve and a separate pressure supply may be provided for the parking brake, as a result of which construction space, weight and installation outlay may be reduced. If at least one selected gearbox driving position may be reset by actuation of the parking brake, it may reliably be avoided that the parking brake is actuated and the forward driving position or the reverse driving position is selected at the same time.

DETAILED DESCRIPTION

Figure 1:
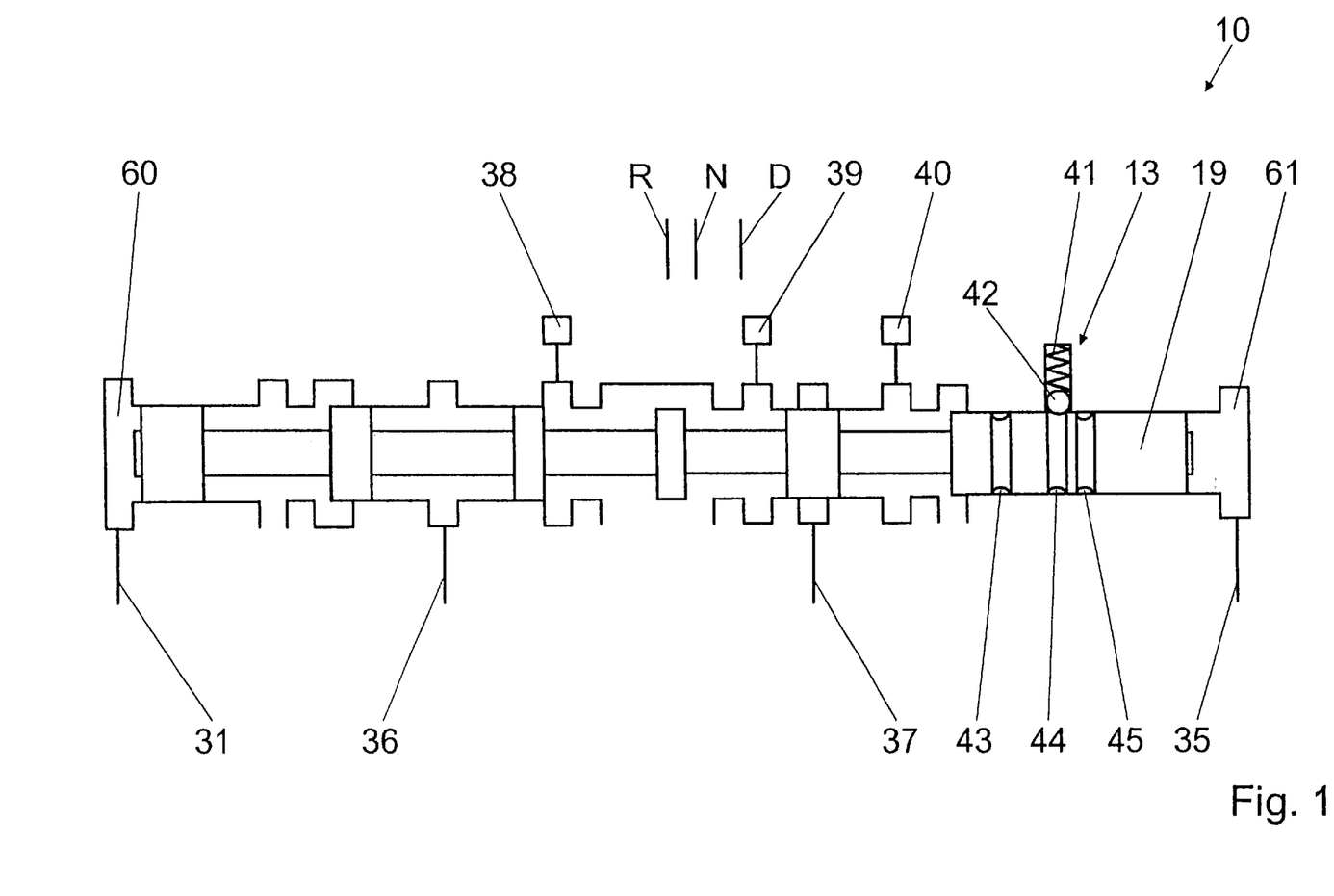
FIG. 1 is a schematic view of a control device having a three-position spool valve and a mechanical retaining device.

FIG. 1 schematically illustrates a part of a control device 10 for selecting gearbox driving positions, specifically a forward driving position D, a reverse driving position R and a neutral position N. The control device 10 includes a spool valve 19 which is configured as a three-position spool valve via which a first pressure connection 36 may be connected to a clutch 38 (illustrated schematically) for the forward driving position D, and a pressure connection 37 may be connected to a brake 39 (illustrated schematically) for the forward driving position D and to a brake 40 (illustrated schematically) for the reverse driving position R.

Pressure supplies 31, 35 to the spool valve 19 may be produced by two shift valves (not illustrated in greater detail), in which one pressure supply 31 leads into a pressure chamber 60 at a first end of the spool valve 19 and one pressure supply 35 leads into a pressure chamber 61 at a second end of the spool valve 19. Charging the pressure chamber 60 or the pressure chamber 61 with pressure enables the spool valve 19 to be actuated and the gearbox driving positions R, N and D to be selected. In a left end position of the spool valve 19, the reverse driving position R is selected, in a central position, the neutral position N is selected, and in a right end position of the spool valve 19, the forward driving position D is selected.

According to the present invention, the control device 10 includes a retaining device 13 via which, if the shift valves should fail, the spool valve 19 may be fixed in its control position and the selected gearbox driving position R, N or D may be retained. The retaining device 13 is implemented purely mechanically and includes a latching spring 41, which stresses a latching ball 42 in the direction of the spool valve 19. If a certain control position for a gearbox driving position R, N or D is reached, the latching ball 42 latches in one corresponding annular groove 43, 44, 45, where the annular groove 43 is assigned to the forward driving position D, the annular groove 44 is assigned to the neutral position N and the annular groove 45 is assigned to the reverse driving position R. The spool valve 19 is illustrated in the neutral position N. The pressure supplies 31, 35 have an identical pressure level and are configured exclusively for selecting the forward driving position D, the reverse driving position R and the neutral position N. A parking brake (not illustrated in greater detail) is implemented with a separate spool valve and a separate pressure supply.

Figure 2:
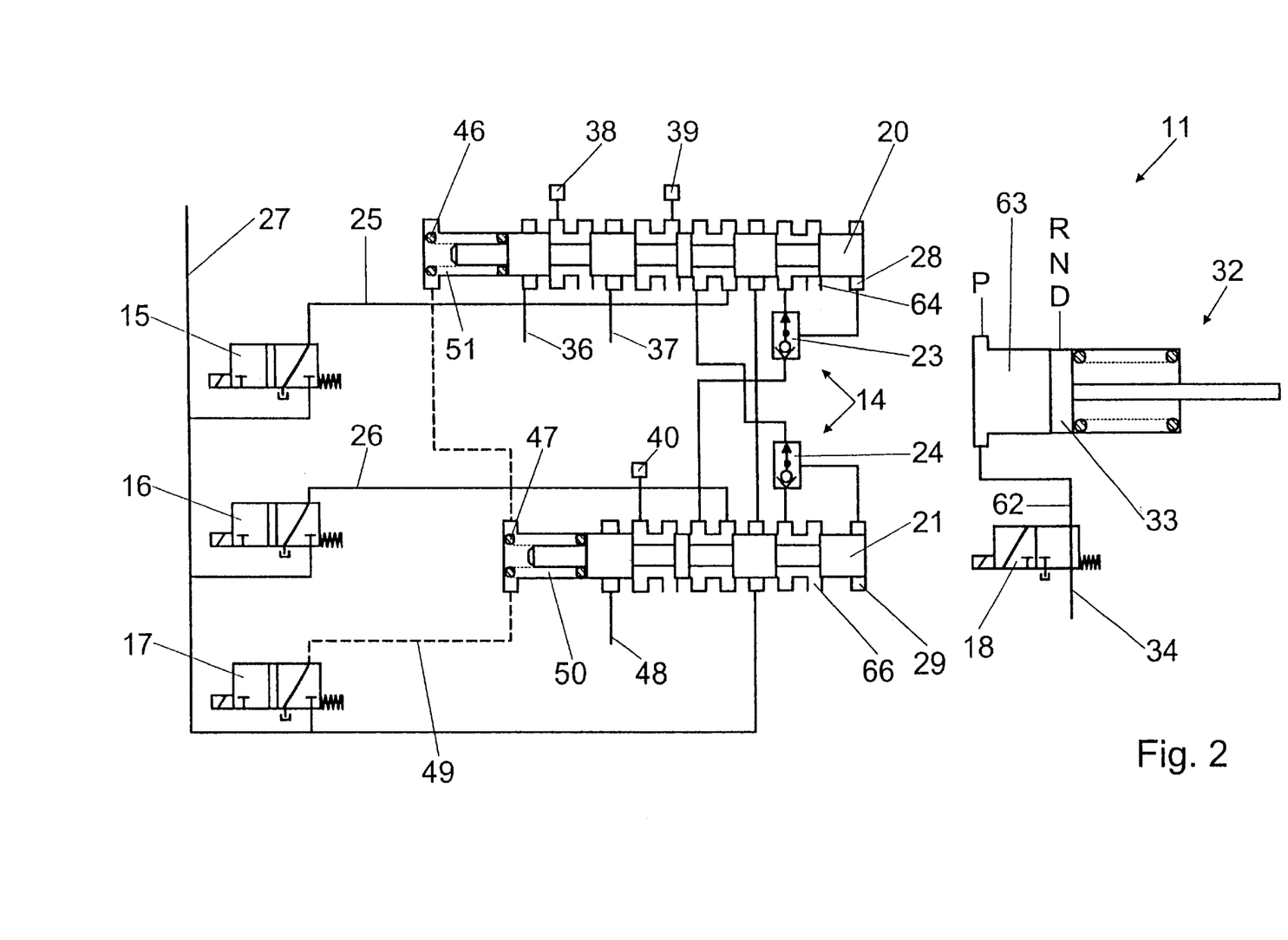
FIG. 2 is a schematic view of a control device having two two-position spool valves and a separate spool valve for a parking brake.
Figure 3:
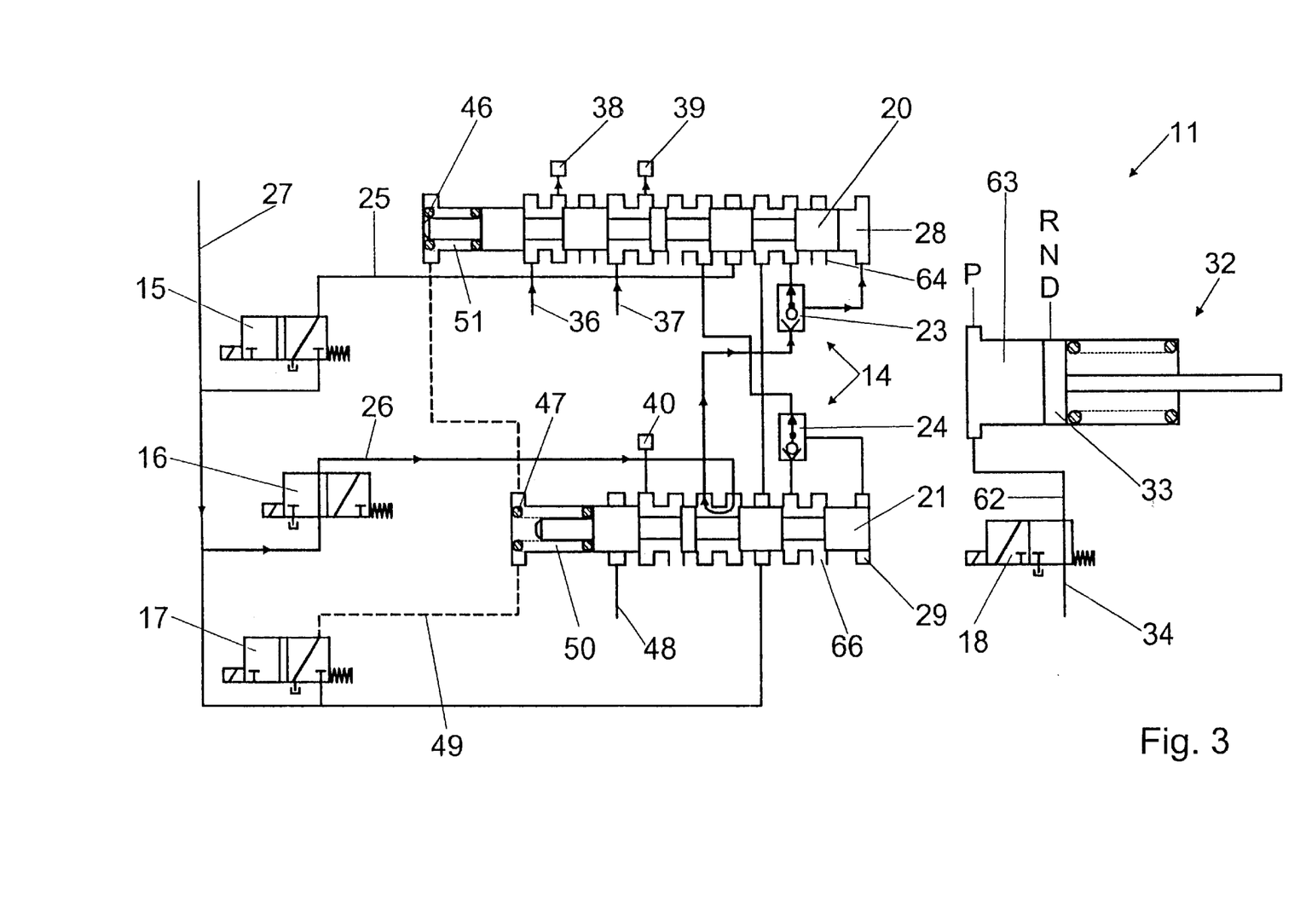
FIG. 3 is a schematic view of the control device illustrated in FIG. 2 with an activated shift valve for a forward driving position.
Figure 4:
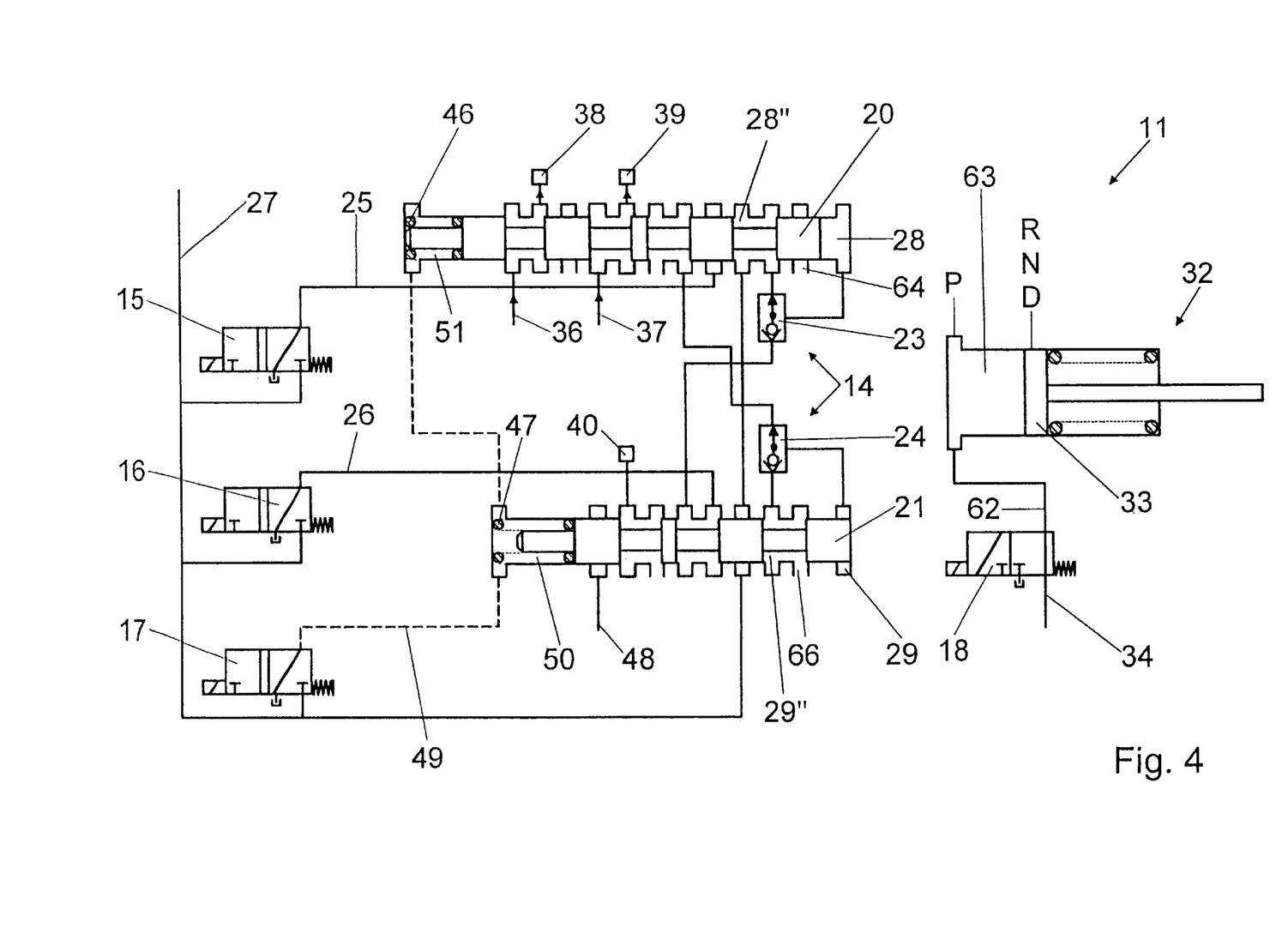
FIG. 4 is a schematic view of the control device illustrated in FIG. 2 after the forward driving position is selected.

FIGS. 2, 3 and 4 illustrate an alternative example embodiment of control device 11 illustrated in FIG. 1. In the illustrated example embodiments, components that remain essentially the same are numbered with the same reference numerals. Furthermore, with regard to features and functions of the example embodiment illustrated in FIGS. 2, 3 and 4 that remain the same, reference may be made to the description of the example embodiment illustrated in FIG. 1.

The control device 11 includes a first spool valve 20, which is configured as a two-position spool valve, for a forward driving position D and a second spool valve 21, which is configured as a two-position spool valve for a reverse driving position R. Via the first spool valve 20, a pressure connection 36 may be connected to a clutch 38 (illustrated schematically) for the forward driving position D, and a pressure connection 37 may be connected to a brake 39 for the forward driving position D. Via the second spool valve 21, a pressure connection 48 may be connected to a brake 40 for the reverse driving position R.

Furthermore, the control device 11 includes a pulse-controlled, electromagnetic shift valve 16 for the forward driving position D and a pulse-controlled, electromagnetic shift valve 15 for the reverse driving position R, via which shift valves a respective pressure connection 25, 26 from, in total, one pressure supply 27 of the control device 11 may be shifted to the respective spool valve 20, 21 in order to actuate the spool valves 20, 21.

FIG. 2 illustrates the spool valves in a neutral position N. The two-position spool valves are retained in their right end positions via a respective compression spring 46, 47.

If the forward driving position D is selected and the shift valve 16 is activated, the pressure connection 26 from the pressure supply 27 to the first spool valve 20 is produced (FIG. 3). According to the present invention, the pressure connection 26 is conducted via the second spool valve 21. If the reverse driving position R were selected, i.e., the second spool valve 21 is in its left end position, the pressure connection 26 for the forward driving position D would be interrupted by the second two-position spool valve 21, or could not be produced, which may avoid the possibility of the forward driving position D being selected when the reverse driving position R is selected.

Furthermore, the pressure connection 26 is conducted via a (ball) changeover valve 23 of a hydraulic retaining device 14, which ball changeover valve, when the shift valve 16 is activated, enables the pressure connection 26 between the pressure supply 27 and a pressure chamber 28 on the first spool valve 20, specifically by a ball of the changeover valve 23 being changed over from a first position into a second position (FIGS. 2 and 3). If the first spool valve 20 is displaced into its left end position by the pressure in the pressure chamber 28 and the forward driving position D is selected, the pulse-controlled shift valve 16 falls back into its initial position (FIG. 4). The pressure 27 in the pressure chamber 28" (FIG. 4) causes the ball of the changeover valve 23 to be shifted back again into its initial position, as a result of which a return flow from the pressure chamber 28 is reliably avoided. The first spool valve 20 is fixed in its control position. If the shift valve 16 should fail, when the forward driving position D is selected it may be retained and a motor vehicle may at least be moved out of a danger area.

If, starting from the neutral position N (FIG. 2), the reverse driving position R is selected and the shift valve 15 activated, the pressure connection 25 from the pressure supply 27 to the second spool valve 21 is produced (not illustrated in greater detail). According to the present invention, the pressure connection 25 is conducted via the first spool valve 20. If the forward driving position D were selected, i.e., the first spool valve 20 is in its left end position, the pressure connection 25 for the reverse driving position R would be interrupted by the first spool valve 20, or could not be produced, which may avoid the possibility of the reverse driving position R being selected when the forward driving position D is selected.

Furthermore, the pressure connection 25 is conducted via a (ball) changeover valve 24 of the hydraulic retaining device 14, which ball changeover valve, when the shift valve 15 is activated, enables the pressure connection 25 between the pressure supply 27 and a pressure chamber 28 on the second spool valve 21, specifically by a ball of the changeover valve 24 changing over from a first position into a second position. If the second spool valve 21 is displaced into its left end position by the pressure in the pressure chamber 29 and the reverse driving position R is selected, the pulse-controlled shift valve 15 falls back into its initial position. The pressure 27 in the pressure chamber 29" (FIG. 4) causes the ball of the changeover valve 24 to be shifted back again into its initial position, as a result of which a return flow from the pressure chamber 29 is reliably avoided. The second two-position spool valve 21 is fixed in its control position. If the shift valve 15 should fail, when the reverse driving position R is selected, it may be retained and a motor vehicle may at least be moved out of a danger area.

In order to reset the forward driving position D or the reverse driving position R into the neutral position N, a pulse-activated, electromagnetic shift valve 17 is activated and a pressure connection 49 to pressure chambers 50, 51 produced. The pressure chambers 50, 51 are arranged on the spool valves 20, 21 on a side opposite the pressure chambers 28, 29. Furthermore, the compression springs 46, 47 are arranged in the pressure chambers 50, 51.

The same hydraulic pressure arises in all four pressure chambers 28, 29, 50, 51, but a spring force of the compression springs 46, 47 produces an overall larger actuating force on the spool valves in the direction of their right end positions. The spool valves 20, 21 are displaced into their right end positions. As this occurs, some pressure medium is conducted back out of the pressure chamber 28 or 29 via the changeover valve 23 or 24 into the pressure supply 27 and some into a return feed 64 or 66. The forward driving position D or the reverse driving position R is reset and the neutral position N is selected.

The pressure supply 27 is configured exclusively for selection for the forward driving position D, the reverse driving position R and the neutral position N. A parking brake 32 is implemented with a separate spool valve 33 and a separate pressure supply 34. A pressure connection 62 between the pressure supply 34 and a pressure chamber 63 of the parking brake 32 may be shifted via a pulse-controlled, electromagnetic shift valve 18. If the shift valve 18 is deactivated, the gearbox driving positions R, N and D may be selected. If the shift valve 18 is activated and the parking brake 32 actuated, the gearbox driving positions R, N and D cannot be selected, specifically in that the pressure chambers 50, 51 are charged with pressure via a pressure connection (not illustrated in greater detail).

FIGS. 5 to 8 illustrate an alternative example embodiment of control device 12. The process of selecting the forward driving position D and the reverse driving position R from the neutral position N proceeds in accordance with the example embodiment illustrated in FIGS. 2 to 4. In this regard, reference may be made to the description for the example embodiment illustrated in FIGS. 2 to 4.

Figure 5:
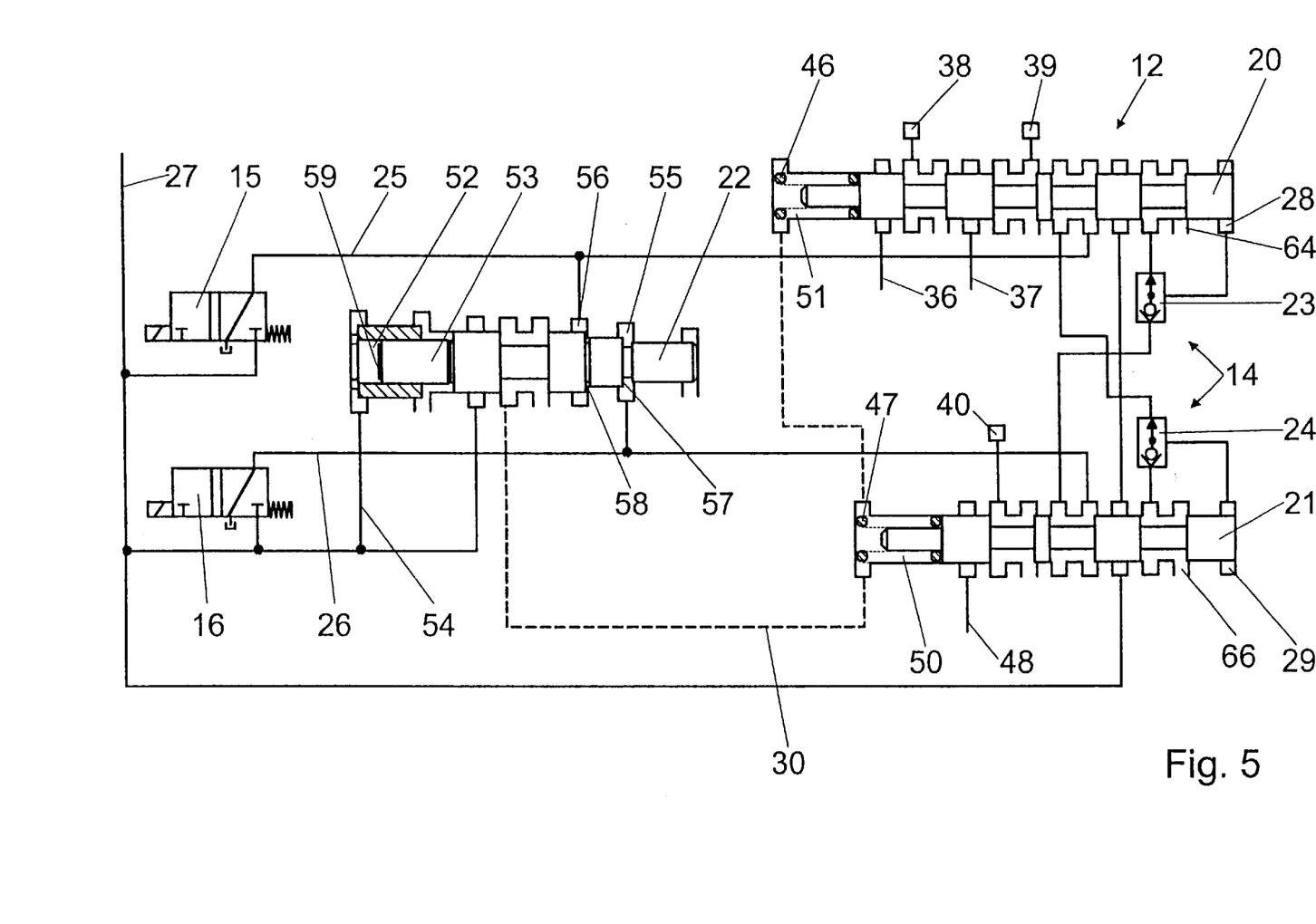
FIG. 5 is a schematic view of a control device having an additional spool valve for a neutral position.
Figure 6:
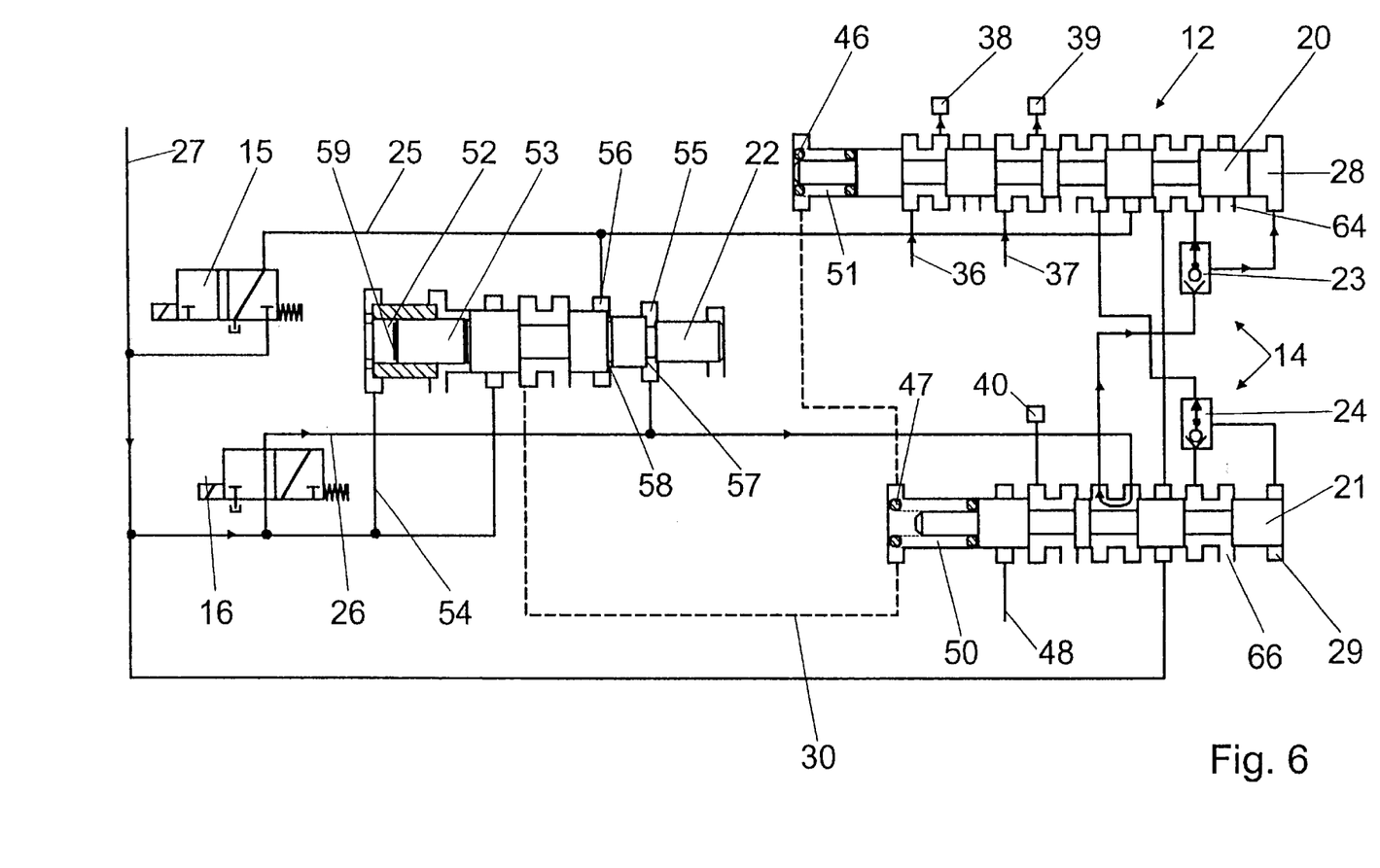
FIG. 6 is a schematic view of the control device illustrated in FIG. 5 with an activated shift valve for a forward driving position.
Figure 7:
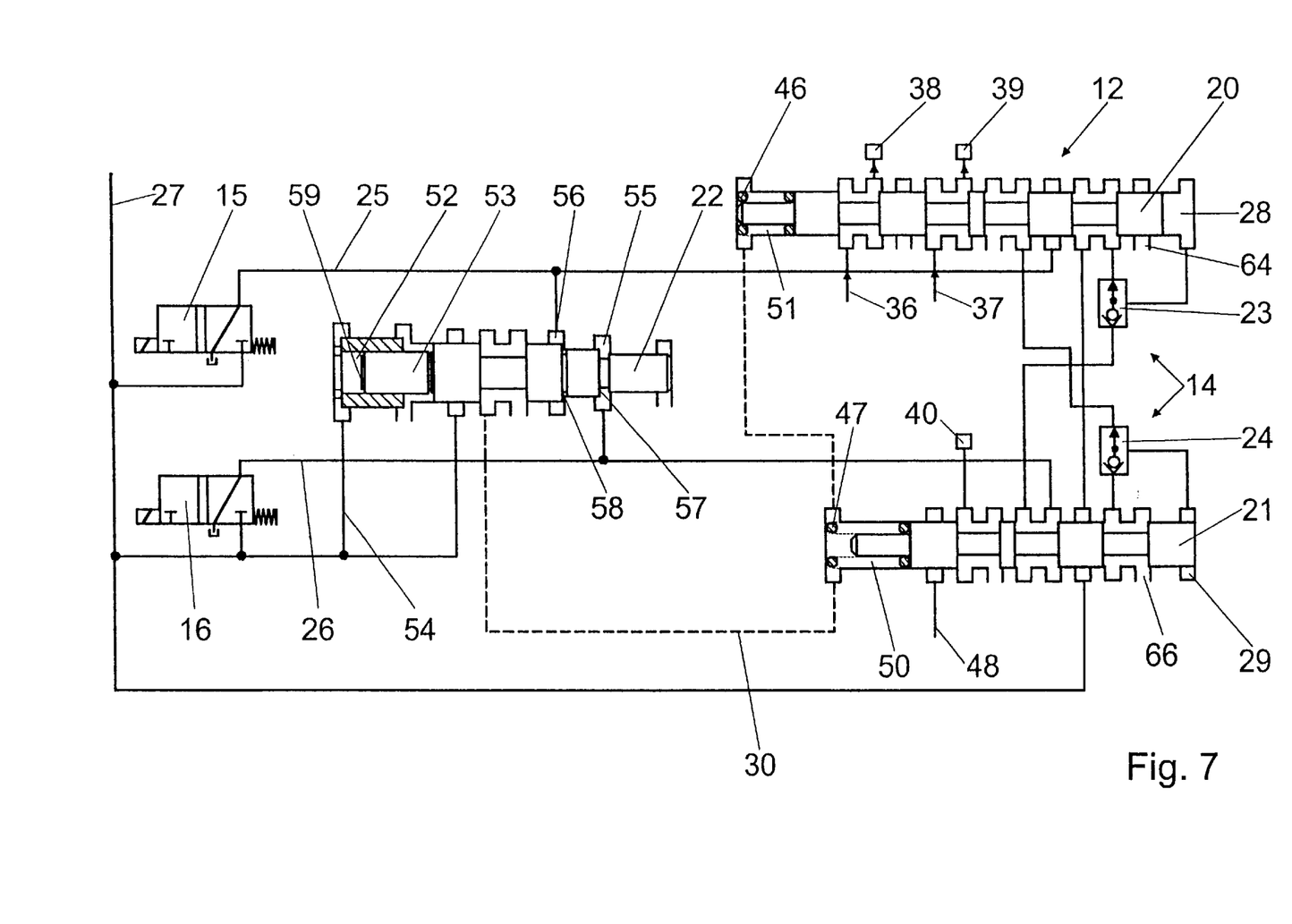
FIG. 7 is a schematic view of the control device illustrated in FIG. 5 after the forward driving position is selected.

The difference of the example embodiment illustrated in FIGS. 5 to 8 as compared with the example embodiment illustrated in FIGS. 2 to 4 relates to the shift valve 17 being replaced by a spool valve 22, which is configured as a two-position spool valve 22. If an internal combustion engine of a motor vehicle is switched on, the pressure supply 27 and a pressure connection 54 are used to charge a pressure chamber 52 with pressure, the pressure chamber being bounded in the direction towards the spool valve 22 by a piston 53. The spool valve 22 is displaced into its right end position via the piston 53. By the piston 53, a statically over-determined mounting of the spool valve 22 may be avoided. FIG. 5 illustrates the control device 12 in the neutral position N, FIG. 6 illustrates the control device 12 during the process of selecting the forward driving position D, and FIG. 7 illustrates the control device 12 after the forward driving position D is selected and with deactivated shift valve 16.

Figure 8:
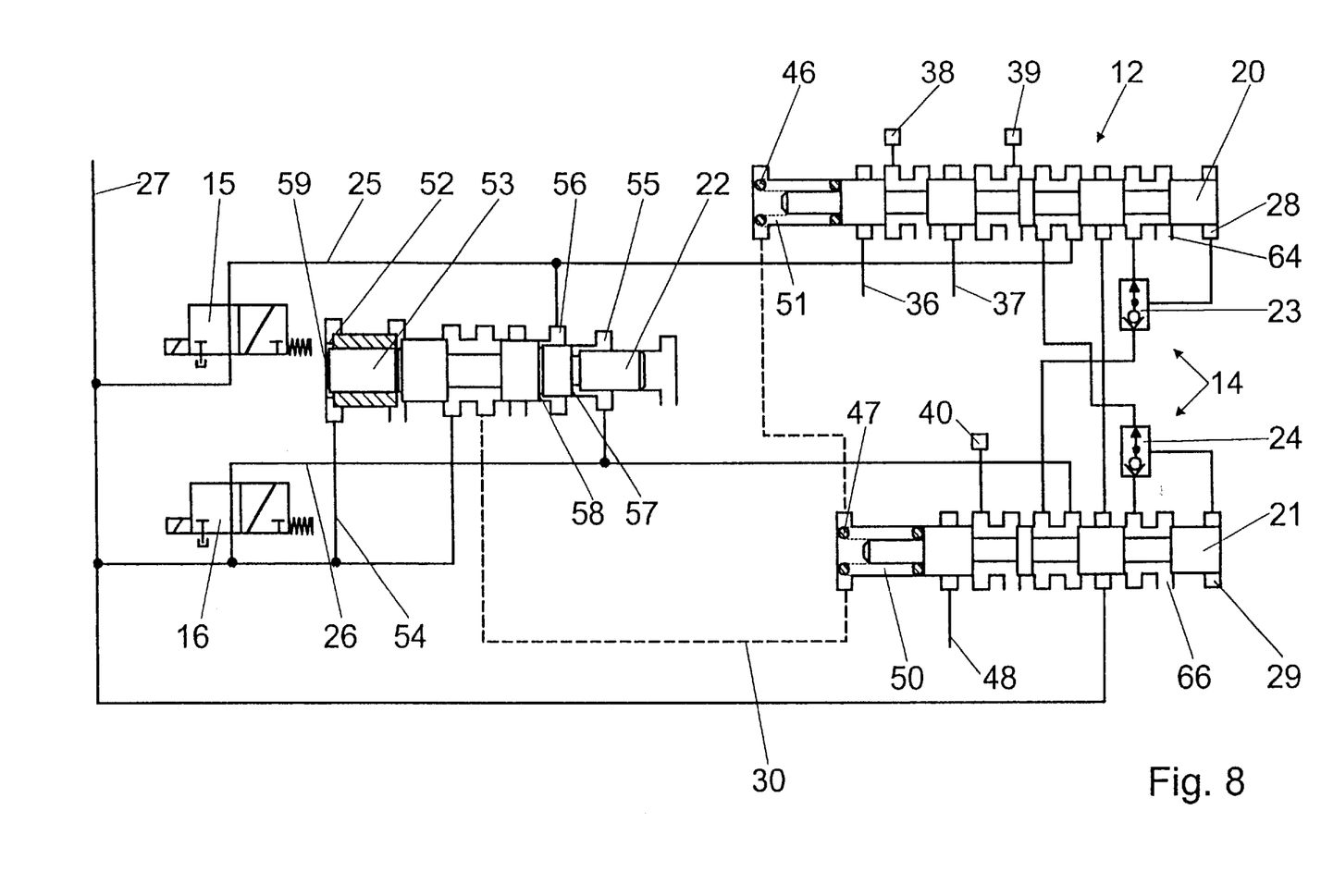
FIG. 8 is a schematic view of the control device illustrated in FIG. 5 when a neutral position is selected.

In order to reset the forward driving position D or the reverse driving position R, the two shift valves 15, 16 are activated simultaneously (FIG. 8). This causes two pressure chambers 55, 56 on the spool valve 22 to be charged with pressure via the pressure connections 25, 26. The pressure in the pressure chamber 55 acts on the spool valve 22 via a first surface 57, and the pressure in the pressure chamber 56 acts via a second surface 58 in the direction of the left end position of the spool valve 22. The surfaces 57, 58 are larger in total than a piston surface 59 of the piston 53. The same pressures prevail in the pressure chambers 52, 55, 56. However, because of the larger surface 57, 58 in total, the spool valve 22 is displaced into its left end position, and the pressure chambers 50, 51 are charged with pressure from the pressure supply 27 via a pressure connection 30. The spool valve 20 is displaced into its right end position, and the forward driving position D that has been selected or the reverse driving position R that has been selected is reset.

The pressure supply 27 is configured exclusively for selection for the forward driving position D, the reverse driving position R and the neutral position N. A parking brake (not illustrated in greater detail) is implemented with a separate spool valve and a separate pressure supply. If the parking brake is actuated, the gearbox driving positions R, N and D cannot be selected, specifically in that the pressure chambers 50, 51 are charged with pressure via a pressure connection (not illustrated in greater detail).

What is claimed is:

1. An automatic gearbox, comprising:
   a control device configured to select a gearbox driving position, the control device including:
   a spool valve configured to connect a pressure connection to a consumer;
   a shift valve configured to shift a pressure connection from a pressure supply of the control device to the spool valve to actuate the spool valve; and a retaining device configured to fix the spool valve in at least one control position and to retain a selected gearbox driving position in accordance with a failure of the shift valve;

wherein the retaining device includes a hydraulic retaining device; and wherein the retaining device includes a changeover valve configured to enable a pressure connection between the pressure supply and a pressure chamber on the spool valve when the shift valve is activated and to change over and prevent a return flow from the pressure chamber when the shift valve is subsequently deactivated.

2. An automatic gearbox, comprising:

a control device configured to select a gearbox driving position, the control device including:
  a first spool valve for a first gearbox driving position and a second spool valve for a second driving position, the first spool valve and the second spool valve each being configured to connect a connection to a consumer; and
  a first shift valve for the first gearbox driving position and a second shift valve for the second gearbox driving position, the first shift valve being configured to shift a pressure connection from a pressure supply of the control device to the first spool valve to actuate the first spool valve;

wherein the pressure connection that is shiftable via the first shift valve for the first gearbox driving position is conducted via the second spool valve;

and wherein the pressure connection for the first gearbox driving position is interrupted by the second spool valve when the second gearbox driving position is selected.

3. The automatic gearbox according to claim 2, wherein the second shift valve is configured to shift a pressure connection from a pressure supply of the control device to the second spool valve to actuate the second spool valve;

wherein the pressure connection that is shiftable via the second shift valve for the second gearbox driving position is conducted via the first spool valve; and wherein the pressure connection for the second gearbox driving position is interrupted by the first spool valve when the first gearbox driving position is selected.

4. The automatic gearbox according to claim 3, wherein the control device includes a third spool valve for a third gearbox driving position, the third spool valve being configured to be actuated by simultaneous activation of the first shift valve and the second shift valve, actuation of the third spool valve providing a pressure connection configured to reset at least one of the first spool valve and the second spool valve.

5. The automatic gearbox according to claim 2, wherein at least one of the first shift valve and the second shift valve is configured to be pulse-controlled.

6. The automatic gearbox according to claim 2, wherein a pressure supply of the control device is configured to select at least one of an at least one forward driving position, an at least one reverse driving position and a neutral position.

7. The automatic gearbox according to claim 6, further comprising a separate spool valve and a separate pressure supply corresponding to a parking brake.

8. The automatic gearbox according to claim 7, wherein the parking brake is configured to reset at least one gearbox driving position in accordance with an actuation of the parking brake.

* * * * *